Patented Feb. 17, 1925.

1,526,746

UNITED STATES PATENT OFFICE.

JACOB FRIEDMAN, OF NEW YORK, N. Y.

MAKING GLUCOSE AND OTHER SIRUPS FOR USE IN FORMING LIQUIDS OR SOLIDS.

No Drawing. Application filed April 17, 1922. Serial No. 553,986.

*To all whom it may concern:*

Be it known that I, JACOB FRIEDMAN, a citizen of the United States, residing at New York city, in the county of New York and State of New York, have invented certain new and useful Improvements in Making Glucose and Other Sirups for Use in Forming Liquids or Solids, of which the following is a specification, reference being had to the accompanying drawings.

This invention relates to the art of preparing sirups, such as glucose, molasses, treacle, cane sirup, for use in the manufacture of confectionery, jams, jellies, and beverages.

Glucose is used in the manufacture of candy for the purpose of giving the candy a longer life, that is to keep the goods manufactured from "graining" and also to reduce the cost. If candy were made from sugar alone it would lose its life in a few hot days. It would "grain off" and lose its transparency and flavor. Furthermore, the use of sugar would increase the cost considerably. It is a matter of fact that some classes of the finest candy must be made with glucose and cannot be made with sugar alone, as the sugar would not stand the steady mixing or stirring while heated or the "working out" in heat, as it would grain off. For instance, where caramels are made with cream or milk it is impossible to make the same without the use of glucose, corn sirup, or other sirup known as glucose or brewer's sugar, which is used for beverages.

The boiled sirup, such as glucose or corn sirup, is either sold in a solid mass or is powdered or granulated for use by the manufacturer of candy. If the glucose or other sirup is solidified into a mass, the user must break it up, grind it and re-boil it, or if it is sold in a granulated or powdered form then in a few days the powdered or granulated mass will return to its solid form and again the manufacturer must break it up and granulate it. If the solid or granulated glucose or glucose in the form of sirup alone is used, or if glucose or corn sirup is used with sugar, the candy made therefrom is very hard to market for the reason that on days when there is a great amount of humidity, in rainy weather, or in warm weather, the candy or other preparation made therefrom is liable to be sticky to the hands or stick to the paper in which it is wrapped or to run down to a sirupy form again or dissolve in the wrappers, or where it is sold in drops or in a mixture the particles will stick together, and when sold in powdered or granular form they will run together and become a solid mass, and this is equally true of other sirups beside corn sirup or glucose. Furthermore, in preparing the corn sirup manufacturers have to use a bleach, which may be sulphuric acid, oxalic acid or an alkali. The use of the majority of these bleaches is forbidden by the Government, but the practice is still going on for the reason that dark corn sirup cannot be used to produce white candy or sirup without bleaching.

It is the object of this invention to overcome the above difficulties and permit the use of sirups as above described for making candy, jams, jellies or beverages by mixing with any of these sirups a certain amount of gum, preferably gum tragacanth or astroglorium. I have found in actual practice and after considerable experiments and tests that by boiling the sirup in a vacuum cooker and adding thereto a solution of gum tragacanth the mass when made into candy drops, in solid bodies, or in powdered or granular form will keep during rainy weather and in the open air. This mass so made, whether solid, granular or powdered, remains dry, does not get sticky or run down, and stands up better and drier than if the mass had been made with sugar alone. Furthermore, the mass when boiled is lighter in color, the gum tragacanth thus acting as a bleach as well as a drier.

In carrying out my process, the solution of gum tragacanth, otherwise known as astroglorium, may be added in the initial manufacture of the glucose or other sirup, or the gum may be added later by dissolving the sirups and adding the gum to the solution. The gum is dissolved previous to using, that is previous to adding it to the batch of sirup or in the manufacture of the candy. The gum is dissolved in forty times its weight of water more or less and the amount of gum used equals approximately two pounds to a five thousand pound batch. It will be understood that this is the average amount used and that some times more and some times less gum is used with a five thousand pound batch, depending upon the time of the year and for what purpose the sirup is to be used. The gum solution is added to the sirup either at the beginning and the sirup with the gum added thereto boiled from 220° F. to 248° F. for barrelling, or to bring it to a sirupy consistency, or it is boiled from 270° F. to 350° F. for the purpose of making it into a solid form, either for stick or bulk, or to provide a mass which may be granulated or powdered. The gum can be added either at the beginning of the process of sirup making or at any other time during the boiling process.

While I have heretofore referred to the use of gum tragacanth or astroglorium, I wish it understood that other gums, such as gum arabic, could be utilized for this purpose, though I have found that gum tragacanth is greatly superior to other gums. I do not wish to be limited to the quantities or proportions above stated, as these will vary with different conditions. I do not wish to be limited to the use of this gum in the initial preparation of the sirup, as the gum might be added to sirup made by melting down solid or granular masses of glucose and in the manufacture of the candy or in the manufacture of jams, jellies or other confections or beverages. This invention permits glucose or equivalent sirups to be used in the manufacture of candies to an extent not possible without the use of a gum.

While gum arabic, gum tragacanth and other like gums have been used in manufacturing candy, such as gum drops and the like, these gums have simply been used for the purpose of holding the particles of the candy together. Gelatin has also been used in candies, jellies and the like, but gelatin cannot be used for the manufacture of a base for making candies for the reason that the gelatin cannot be brought to a boiling point without burning. It will be seen that my process provides a base for making candies, jellies, jams and beverages, which base may be either in a liquid form, a solid form, or in a granular or pulverized form, and by the term "base" I mean to include a mass capable of use in candy making or in the manufacture of jams, jellies or beverages, which mass may be either in a liquid form, a solid form, or granulated or powdered.

I claim:—

1. A step in the process of making a base for candies, jams, jellies and beverages consisting in intimately mixing a solution of gum tragacanth with glucose sirup while the sirup is at the boiling point.

2. A step in the process of making a base for candies, jams, jellies and beverages consisting in raising glucose sirup to the boiling point and adding thereto a solution of gum tragacanth in the proportion of about two pounds of gum to five thousand pounds of sirup.

3. The process of making a base for candies, jams, jellies and beverages consisting in bringing glucose sirup to the boiling point, adding thereto a relatively small proportion of gum tragacanth, raising the temperature from 200° F. to 350° F., cooling the mass, and grinding the same.

In testimony whereof I hereunto affix my signature.

JACOB FRIEDMAN.